United States Patent [19]
Harbottle

[11] 3,890,015
[45] June 17, 1975

[54] SINGLE ROW TAPERED ROLLER BEARING ASSEMBLY CAPABLE OF TAKING THRUST LOADING IN BOTH AXIAL DIRECTIONS AND METHOD OF ADJUSTING THE SAME

[75] Inventor: William E. Harbottle, North Canton, Ohio

[73] Assignee: The Timken Company, Canton, Ohio

[22] Filed: Jan. 16, 1974

[21] Appl. No.: 433,679

[52] U.S. Cl............... 308/1 R; 308/207 R; 308/211
[51] Int. Cl. ............................................ F16c 29/12
[58] Field of Search........ 308/1 R, 174, 207 R, 211, 308/189, 206; 29/148.4, 149.5

[56] References Cited
UNITED STATES PATENTS

| | | | |
|---|---|---|---|
| 3,420,589 | 1/1969 | Green et al. | 308/174 |
| 3,726,576 | 4/1973 | Barnbrook et al. | 308/207 |
| 3,804,477 | 4/1974 | Allmandinger et al. | 308/207 |

Primary Examiner—M. Henson Wood, Jr.
Assistant Examiner—Gene A. Church
Attorney, Agent, or Firm—Gravely, Lieder & Woodruff

[57] ABSTRACT

A single row tapered roller bearing capable of taking thrust loading in both axial directions as well as radial loading has rollers which are confined radially by tapered confining surfaces (raceways) and axially by end confining surfaces (on rib rings). The bearing is adjusted by bringing the rollers into a condition wherein all end play is eliminated and holding one of the confining surfaces in a fixed axial position relative to a remotely located reference surface. Then axial movement between the inner tapered confining surface and the end confining surface at the large diameter end of the bearing is effected to bring the rollers out of the condition of no end play. Finally, more of the confining surfaces are moved relative to each other to bring the rollers back toward the condition of no end play a known distance, and this movement results in forces being transmitted through the rollers to effect relative movement between the end confining surface at the large ends of the rollers and the inner tapered confining surface. The bearing adjustment is determined at the remote reference surface and the movement of the various confining surfaces is terminated when the end play reaches the prescribed value.

10 Claims, 10 Drawing Figures

PATENTED JUN 17 1975　　　3,890,015

SHEET　　1

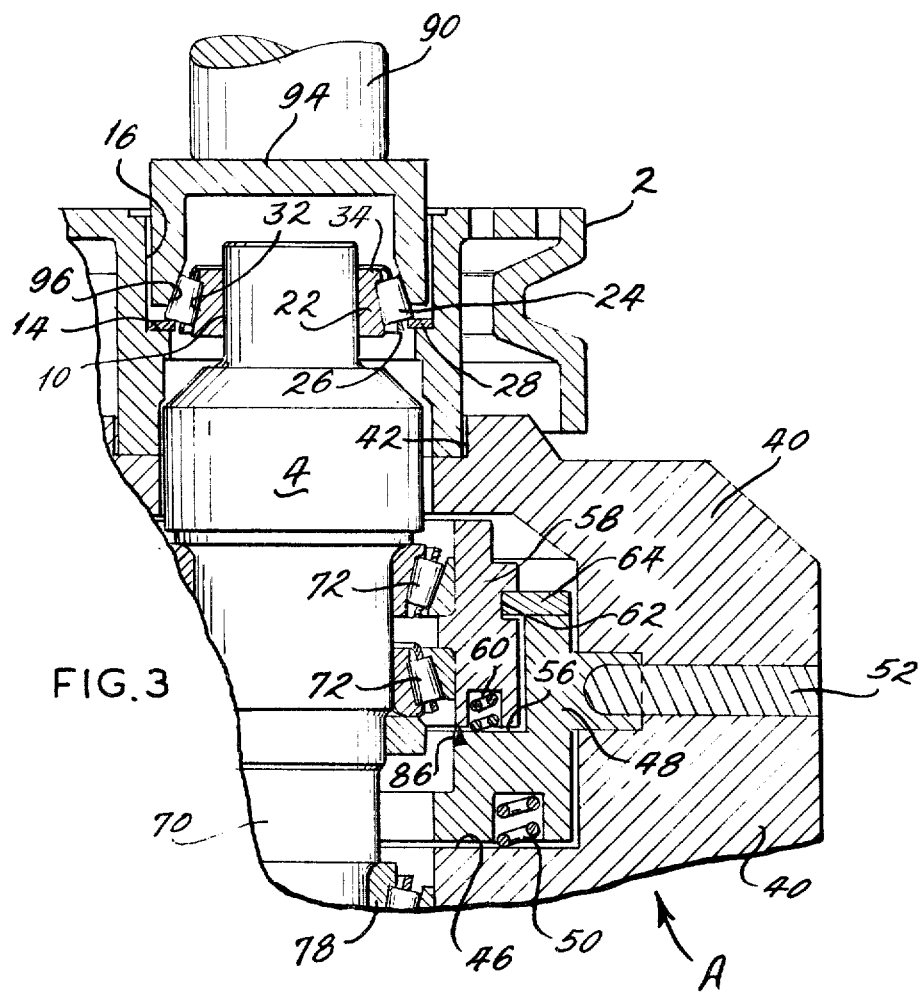
FIG. 3
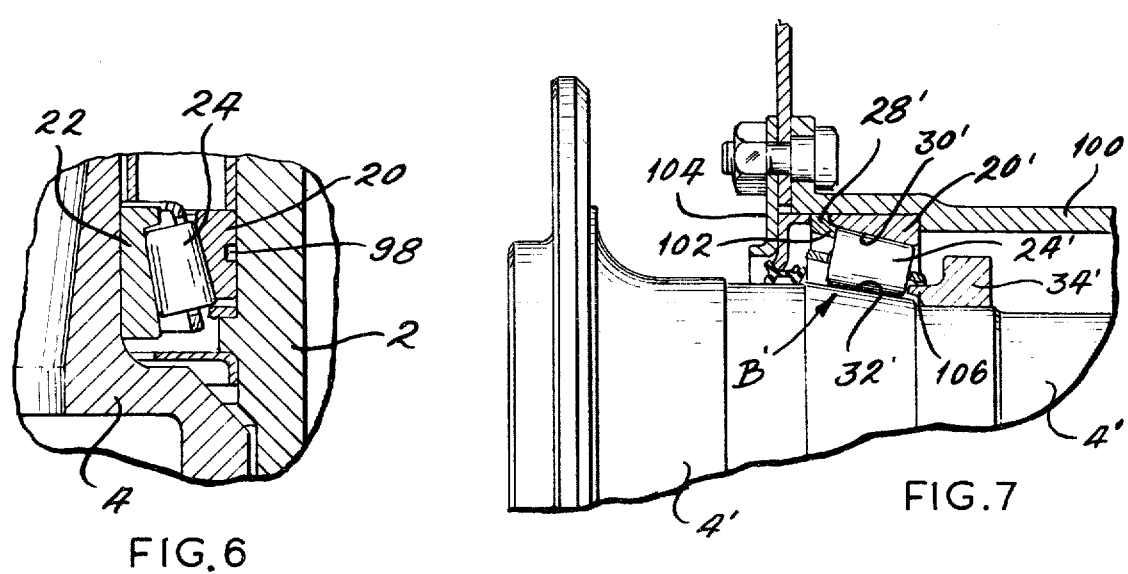
FIG. 6
FIG. 7

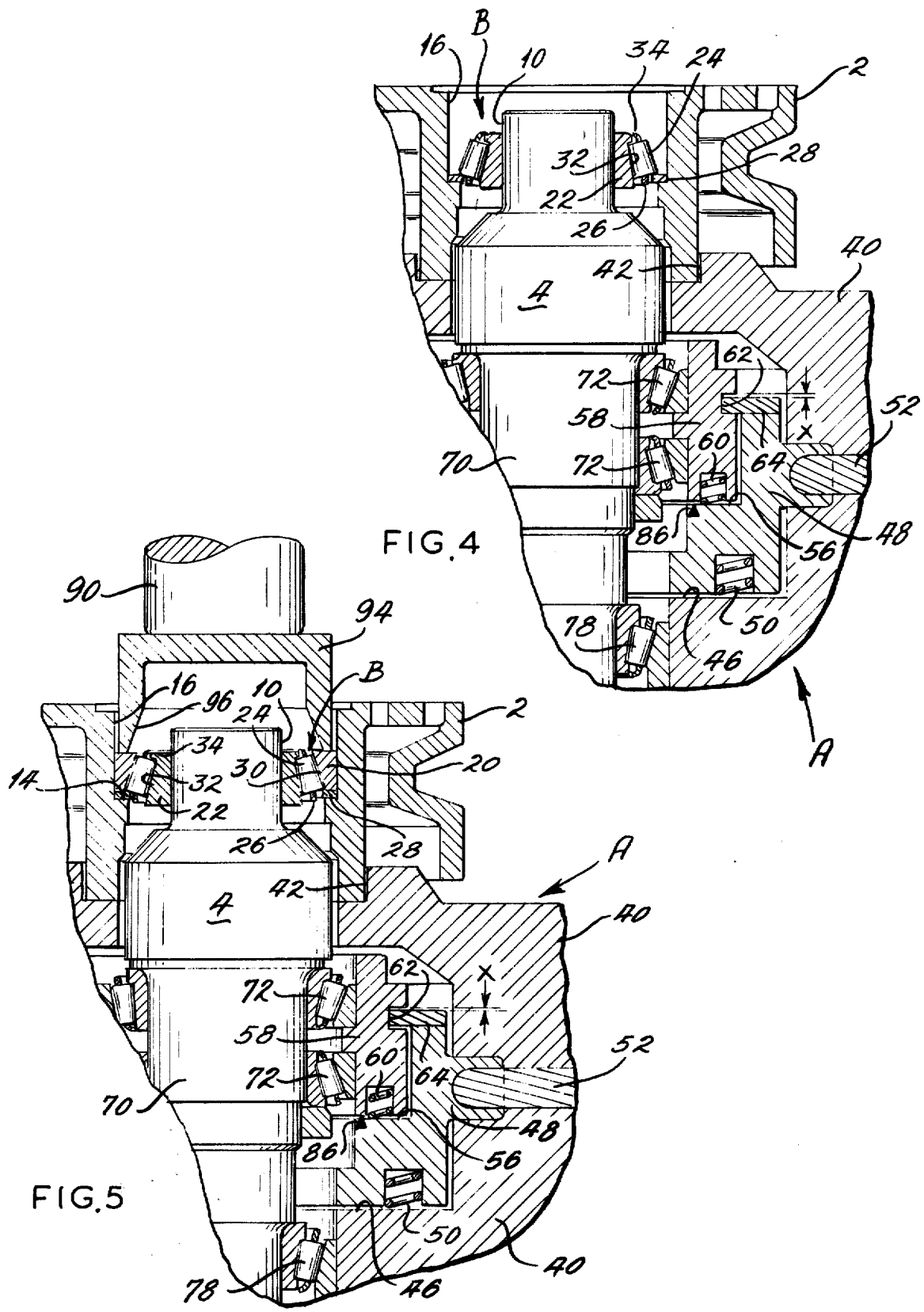

SINGLE ROW TAPERED ROLLER BEARING ASSEMBLY CAPABLE OF TAKING THRUST LOADING IN BOTH AXIAL DIRECTIONS AND METHOD OF ADJUSTING THE SAME

BACKGROUND OF THE INVENTION

This invention relates in general to tapered roller bearings and more particularly to unitized tapered roller bearings and a method for adjusting the same.

The primary advantage of a unitized tapered roller bearing over a conventional tapered roller bearing resides in the capability of a single row unitized bearing to accept thrust loading in both axial directions as well as radial loading. Conventional tapered roller bearings of the single row variety, on the other hand, accept thrust loading in only one axial direction, that is the direction which causes the tapered rollers to seat against the tapered raceways of the cup and cone, and as a result conventional tapered roller bearings are normally employed in pairs with the rollers of each bearing being oriented in opposite directions. Hence, the bearing will take the axial loading in one direction, while the other will accept axial loading in the opposite direction. This arrangement also permits one bearing to be adjusted against the other to achieve the proper amount of end play or preload in the overall bearing assembly.

A unitized tapered roller bearing has a cup and a cone, each provided with tapered raceways, and in addition has a single row of tapered rollers between the opposed raceways on the cup and cone. Moreover, a rib ring or thrust rib is located at the small diameter end of the cone raceway while another rib ring is located at the large diameter end of the cup raceway. These rib rings project radially beyond their respective raceways to form working or confining surfaces against which the end faces of the rollers bear. Normally, the cone rib ring is formed integral with the cone while the cup rib ring is formed separately from the cup to permit assembly of the bearing.

The unitized tapered roller bearing accepts radial loading much as does a conventional tapered roller bearing. Thrust loading, in the axial direction which causes the rollers to seat against its raceways is transmitted generally radially through the rollers, just as in a conventional tapered roller bearing. Thrust loading in the opposite direction is transmitted from one rib ring to the other generally diagonally through the rollers from one roller end face to the other roller end face.

Normally, the unitized bearings are assembled with a slight amount of end play in which case the spacing between the two rib rings is slightly greater than the axial length of the rollers. Consequently, when the thrust loading on the bearing changes direction, the cone will move relative to the cup a slight distance. The magnitude of the distance measured along the axis for the bearing is termed the bearing end play and usually measures in the neighborhood of 0.005 inches.

In order to achieve the prescribed amount of end play upon assembly of a unitized bearing, extremely close tolerances must be held during the manufacture of the bearing components. This makes unitized tapered roller bearings somewhat more expensive than conventional tapered roller bearings. In addition, complicated clamping devices are usually required to hold the large rib ring at the large diameter end of the cup raceway.

Notwithstanding the increased expense, unitized tapered roller bearings have been widely accepted, particularly for rear axle applications in the automotive industry. Such an application is illustrated in U.S. Pat. No. 3,397,020. Another unitized tapered roller bearing is disclosed in U.S. Pat. No. 3,420,589.

SUMMARY OF THE INVENTION

One of the principal objects of the present invention is to provide a process and apparatus for rapidly assembling and adjusting unitized tapered roller bearings. Another object is to provide a process which enables unitized tapered roller bearings to be manufactured without holding close tolerances on many surfaces thereof. A further object is to provide a process which lends itself to adjusting a unitized tapered roller bearing held together without complicated clamping arrangements. An additional object is to provide a single row unit bearing which is easily adjusted by the process. These and other objects and advantages will become apparent hereinafter.

The present invention is embodied in a process whereby a tapered roller bearing capable of taking thrust loading in both axial directions is adjusted by moving various confining surfaces of the bearing to bring the tapered rollers into a preload condition. Then one of the surfaces is held in a fixed axial position with respect to remote reference means, whereupon some of the confining surfaces are moved to place the rollers in a condition of end play. Thereafter, various confining surfaces are moved such that the rollers again approach a condition of preload, and when the bearing reaches the correct adjustment as measured at the remote reference means, the movement is terminated. The invention also resides in the bearing itself. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 3 is a sectional view showing the bearing placed in a condition of no end play in the adjusting bearing apparatus;

FIG. 4 is a sectional view showing the adjusting apparatus with the bearing in an end play condition;

FIG. 5 is a sectional view of the apparatus showing the bearing cup being pressed into the position which will provide the bearing with the correct adjustment;

FIG. 6 is a fragmentary sectional view showing a groove in the bearing cup for further enhancing the holding power of the cup within the pulley;

FIG. 7 is a fragmentary sectional view of a modified bearing assembly which is also adjusted in accordance with the present invention;

DETAILED DESCRIPTION

Figure 1:
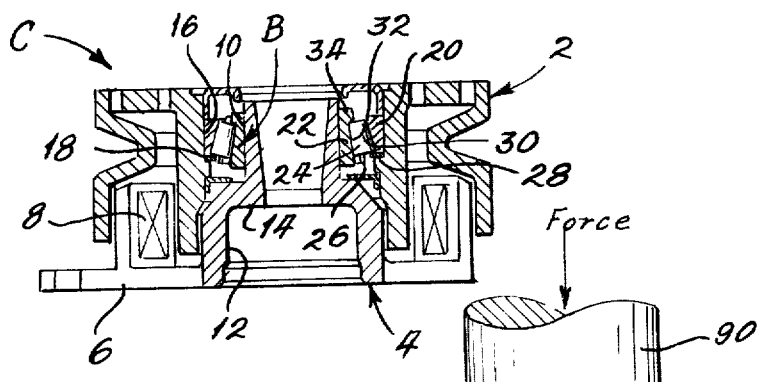
FIG. 1 is a sectional view of a clutch pulley unit provided with a bearing adjusted in accordance with the process of the present invention.

Referring now to the drawings (FIG. 1), B designates a unitized tapered roller bearing which mounts a pulley 2 on a shaft or stub axle 4. Such an arrangement may be used in the clutch/pulley unit C of an automobile air-conditioning system, and in that case the stub axle 4 is welded to a flange 6 which in turn carries an electromagnet 8.

At its one end, the stub axle 4 has a reduced shaft surface 10 of cylindrical configuration, while at the other end it is provided with an enlarged bore 12 which terminates at a shoulder 14. This end is welded to the flange 6. Opening out of one end of the pulley 2 is a bore 16 having a cylindrical configuration, and this bore inwardly terminates at a shoulder 18.

The unitized tapered roller bearing B includes (FIG. 1) a cup 20, a cone 22, tapered rollers 24 between the cup 20 and cone 22, a cage 26 for maintaining the proper spacing between the rollers 24, and a separate cup rib ring 28 which prevents the rollers 24 from moving axially out of the space between the cup 20 and cone 22. The cup 20 fits within the bore 16 of the pulley 2 and its outer diameter is sized for a heavy interference fit, usually on the order of 0.004 to 0.006 inches, so that the cup 20 is held in place by the friction of the interference fit. On its inside face the cup 20 has a tapered raceway 30, the large diameter end of which is located adjacent to the cup rib ring 28 which projects radially inwardly beyond the large diameter end of the raceway 30. The cup rib ring 28, like the cup 20, is sized for an interference fit with the bore 16, and its inside diameter is greater than the large diameter end of the cage 26 so that the end of the cage 26 will project through it. The end of the cup 20 at the large diameter end of the cup raceway 30 is referred to as the cup front face, whereas the opposite end is referred to as the cup back face.

The cone 22 has an internal bore which receives the reduced shaft surface 10 on the stub axle 4, the fit again being an interference fit so that the cone 22 is held in place by the friction of the interference fit. On its outwardly presented surface, the cone 22 is provided with a tapered raceway 32 which is located opposite the cup raceway 30. Formed integral with the cone 22 at the small diameter end of its raceway 30 is a cone rib ring 34 which projects radially outwardly beyond the small diameter end of the cone raceway 30. The cone front face is on the rib ring 34, whereas the cone back face is on the opposite end of the cone 22.

The tapered rollers 24 have tapered side faces which engage the tapered raceways 30 and 32 of the cup 20 and cone 22 respectively. The configuration of the raceways 30 and 32 and the rollers 24 and the location of the integrally formed cone rib ring 34 are all such that the rollers 24 run on apex. This means that lines drawn coincident to the lines of contact between the rollers 24 and the raceways 30 and 32 will meet at a common point along the axis of rotation for the bearing B. When axial loading is applied in the direction which causes the rib rings 28 and 34 to move away from each other, the rollers 24 seat tightly against the raceways 30 and 32 and the loading is transmitted through the rollers 24 generally radially with respect thereto. Hence, the raceways 30 and 32 constitute confining surfaces which confine the rollers 24 in the radial direction. When the axial loading is applied in the opposite direction such that the rib rings 28 and 34 move toward each other, the rib rings 28 and 34 bear against the end faces of the rollers 24 so that the thrust loading is transmitted generally axially through the rollers 24. In this regard, the working surfaces of the rib rings 28 and 34 are beveled to conform to the inclination of the end faces on the rollers 24, and constitute end confining surfaces for confining the rollers 24 in the axial direction.

When the rollers 24 are seated against the raceways 30 and 32 due to thrust loading being applied to the bearing B in the direction which urges the rib rings 28 and 34 apart, the axial distance between the working surfaces of the rib rings 28 and 34 is slightly greater than the axial distance between those portions of the roller end faces located directly opposite the rib ring working surfaces. The difference between the two distances is termed the end play of the bearing B. Consequently, when thrust loading is applied in the opposite direction to move the rib rings 28 and 34 together, relative movement will occur between the cup 20 and cone 22, and the magnitude of this movement will equal the end play built into the bearing. This end play should be between 0.002 and 0.004 inches and preferably 0.003 inches for the bearing B having an 1⅛ inch bore.

The pulley 2, stub axle 4, and bearing B are partially assembled into the clutch unit C on an assembly apparatus A (FIG. 2) which further accurately adjusts the bearing B for the correct amount of end play. The assembly apparatus A includes a fixed base 40 having an upwardly opening recess 42 at its upper end, and this recess is sized to receive and position the pulley 2 with the bore 16 thereof opening upwardly. At its lower end the base 40 has a smooth cylindrical bore 44 and a spring seat 46 above the bore 44.

The spring seat 46 serves as a support for a carriage 48 which is shiftable a limited amount in the axial direction. Actually, the carriage 48 is supported on relatively heavy springs 50 which seat on the spring seat 46 and urge the carriage 48 upwardly. The upwardly directed force applied by the springs 50 may be on the order of 200 lbs. Thus, the carriage 48 will be depressed when subjected to an axially directed force of sufficient magnitude to overcome the springs 50. The base 40 is also provided with clamps 52 which, when actuated, lock the carriage in a fixed position with respect to the base 40, even when the carriage 48 is depressed against the force exerted by the springs 50. The carriage 48 also has a bore 54 and an upwardly presented spring seat 56 at the base of the bore 54.

The bore 54 of the carriage 48 contains an adapter 58 supported on springs 60 which bear against the spring seat 56. The springs 60 are lighter than the springs 50 and exert a force substantially less than the springs 50. For example, if the springs 50 urge the carriage 48 upwardly with a force of about 200 lbs., the springs 60 should urge the adapter 58 upwardly with a force of about 100 lbs. The adapter 58 has a radially directed groove 62 which opens outwardly and receives an annular locking plate 64 which is secured firmly to the upper end of the carriage 48. The thickness of the groove, that is its axial dimension, is slightly greater than the thickness of the locking plate 64 so that a clearance $x$ normally exists at the upper end of the groove. This clearance $x$ may be reduced and eliminated by forcing the adapter downwardly against the force exerted by the springs 60. Indeed, when the clearance $x$ is eliminated, the adapter 58 in effect bottoms out on the carriage 48 and the depressing force is thereafter applied to the carriage 48. Assuming that the clamps 52 are released and the force is great enough to overcome the springs 50, the carriage 48 will likewise be depressed. The adapter 58 has axially directed bores 66 which open out of each end thereof and a radially directed rib 68 which separates the bores 66.

Extended through the hollow interiors of the base 40, carriage 48, and adapter 58 is spindle 70 which rotates relative to the base 40. The upper end of the spindle 70 is configured to fit into the enlarged bore 12 of the stub axle 4 such that the shoulder 14 within the bore 12 rests against the top surface of the spindle 70. When the stub axle 4 is so supported, its reduced shaft surface 10 will be disposed within the bore 16 of the pulley 2. The shaft 70 itself is supported on the adapter 58 by a pair of single row tapered roller bearings 72, the cups of which are fitted snugly in the bores 66 of the adapter 58 with their back faces against the rib 68. The cones of the bearings 72 fit snugly around the spindle 70, with the back face of the upper cone being against an integral shoulder 74 on the spindle 70 and the back face of the lower cone being against a lock nut 76 threaded over the spindle 70. The lock nut 76 is positioned so that it preloads the bearings 72, and consequently, no axial or radial play exists between the spindle 72 and the adapter 58.

The spindle 72 is further confined in the radial direction by another tapered roller bearing 78 having a double cup 80 which fits into the lower bore 44 of the fixed base 40 with just enough clearance that it is free to move axially. The bearing 78 has separate cones which are indirectly mounted, with one cone being against an integral shoulder 82 on the spindle 70 and the other being against a lock nut 84 which is threaded over the spindle 70. The lock nut 84 is positioned to slightly preload the bearing 78 so as to eliminate all radial and axial play within it.

When a downwardly directed axial force is applied to the spindle 70, that force will be transmitted to the adapter 58 through the upper of the two single row bearings 72. The adapter 50 will depress against the force exerted by the light springs 60, until it bottoms out against the carriage locking plate 64, at which time both the adapter 58 and carriage 48 will move downwardly in opposition to the force exerted by the heavy springs 50. The carriage 48 may be locked in any depressed position by the clamps 52 so that when the depressing force is released the springs 60 will move the spindle 70 upwardly a distance equal to the maximum clearance $x$ between the groove 62 and locking plate 64.

The lower end of the spindle 70 is coupled with an electric motor (not shown) to rotate the spindle at relatively slow speed which may be 75 rpm. Also, the carriage 48 is provided with a switch 86 which monitors the position of the adapter 58 relative to the carriage 48 and signals when the clearance $x$ at the upper end of the adapter groove 62 reaches a magnitude equal to the end play desired for the bearing B.

Finally, the apparatus A includes a press ram 90 which moves either a cone driver 92 or a tapered bore driver 94 over the reduced shaft surface 10 of the stub axle 4 when the stub axle 4 is supported on the spindle 70. The cone driver 92 is sized to bear against the front face of the cone 22 and force it over the reduced shaft surface 10. The tapered bore driver 94 is somewhat larger than the cone driver 92, yet is small enough to fit through the bore 16 in the pulley 2. Its inwardly presented surface has a tapered raceway 96 which is identical in size and shape to the tapered raceway of the cup 20.

OPERATION

Figure 2:
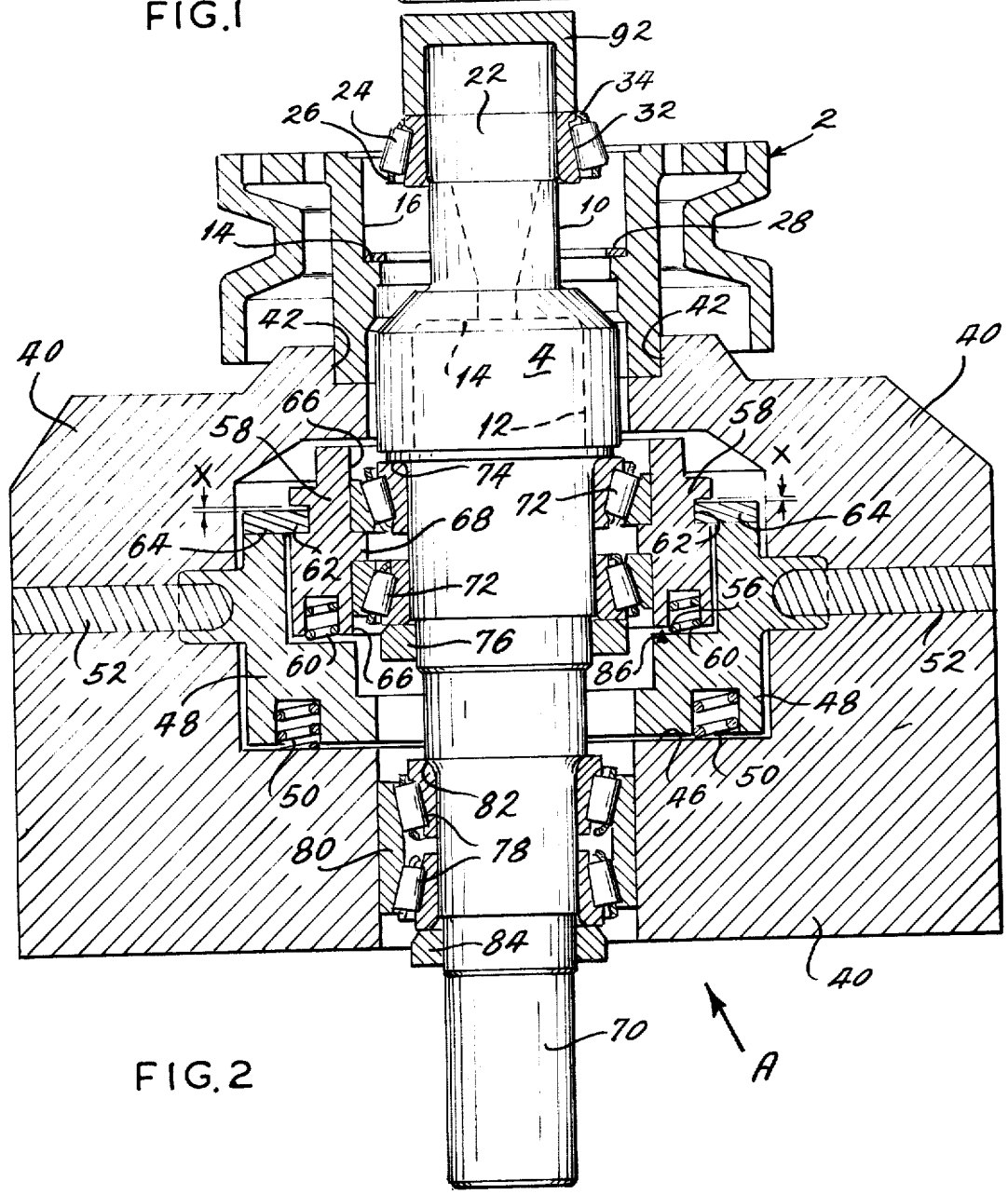
FIG. 2 is a sectional view of an apparatus used to adjust the bearing shown in FIG. 1, with the cone of the bearing being in position for subsequent adjusting steps.

To install the unitized bearing B between the pulley 2 and the stub axle 4 and to further adjust the bearing B so that it has the prescribed amount of end play, the cup rib ring 28 is first pressed into the bore 16 of the pulley 2 until it seats snugly against the shoulder 18 at the inner end of the bore 16. This may be done remote from the apparatus A. In any event, the pulley 2 is installed in the recess 42 of the base 40 such that the unobstructed end of the bore 16 opens upwardly (FIG. 2). Also, the stub axle 4 is fitted over the upper end of the spindle 70 so that its reduced shaft surface 10 projects through the recess 42 at the upper end of the base 40 (FIG. 2). Once the stub axle 4 and the pulley 2 are in place, the cone assembly, which is composed of the cone 22 with the rollers 24 held around it by the cage 26, is installed over the stub axle 4 by pressing the cone 22 over the reduced shaft surface 10 of the axle 4 until the cone 22 reaches a position somewhat removed from its final position. This is accomplished with the cone driver 92. In this position, the large ends of the rollers 24 are against the cup rib ring 28 which is in place, but the small ends of the rollers are spaced from the cone rib ring 34 a substantial distance, or at least a distance greater than the desired end play for the bearing B (FIG. 2). The final position of the cone 22 is dependent on the thickness, that is axial dimension, of the clutch assembly C, and is established later.

Thereafter, the cone driver 92 is detached from the press ram 90 and replaced with the tapered bore driver 94. Then with the clamps 52 of the base 40 released, the tapered bore driver 94 is moved downwardly so as to bring its tapered raceway 96 against the tapered rollers 24 (FIG. 3). The rollers 24 seat perfectly against the raceways 96 and 32 due to the slow rotation of the spindle 70. Continued advancement of the driver 94 imposes a downwardly directed force on the spindle 70, with that force being delivered to the spindle 70 through the rollers 24, the cone 22 and the stub axle 4. As a result, the light springs 60 supporting the adapter 58 collapse. when the spindle 70 moves a distance equal to the maximum clearance $x$ at the upper end of the groove 62 in the adapter 58, the adapter 58 will bottom out against the carriage 48 so that the carriage 48 will begin to move downwardly in opposition to the force exerted by the heavy springs 50.

As the tapered bore driver 94 continues to move the rollers 24 tend to move down the tapers of the raceways 32 and 96 toward the cone rib ring 34. Eventually, a condition of no end play or firm contact is reached and in that condition the small diameter ends of the rollers 24 are against the cone rib ring 34, the large diameter ends are against the cup rib ring 28 and the side surfaces of the tapered rollers 24 contact the raceways 32 and 96 (FIG. 3). In other words, at the condition of no end play, the rollers 24 are held firmly against the rib rings 28 and 34 and radially between the raceways 32 and 96. Actually, the rollers 24 are very lightly preloaded when the condition of no end play is reached and this preload is derived from the springs 50. However, the preload is so slight that it is for all intents and purposes not capable of being measured, that is it does not cause any appreciable deflection of the components of the bearing B. Once the no end play or preload condition is reached, the force resisting the press ram 90 no longer equals the force exerted on the carriage 48 by the heavy springs 50, but instead increases substantially. This increase is sensed at the press ram 90 which is provided with a by-pass valve or some other suitable device for preventing the ram 90 from exerting excessive force on the rollers 24, cone 22, and cup rib ring 28. The cone 22, rollers 24, and tapered bore driver 94 are held in this condition long enough to set the clamps 52, whereupon the force exerted by the press ram 90 is released and the tapered bore driver 94 is retracted. The carriage 48, however, remains in the position to which it was advanced, it being held in that position by the clamps 52, while the adapter 58 is moved upwardly by the light springs 60 a distance equal to the maximum clearance x, which is the free motion permitted between the adapter 58 and carriage 48 (FIG. 4). The spindle 70 and stub axle 4 move upwardly a like amount so that the positioning of the cone 22 with respect to the cup rib ring 28 is that of a bearing having end play equal to the maximum clearance $x$.

Thereafter, the cup 20 is pressed into the bore 16 of the pulley 2 with the tapered bore driver 94 (FIG. 5) and eventually the tapered raceway 30 of the cup 20 will contact the rollers 24 and apply a downwardly directed force to the spindle 70, causing it to move downwardly against the force exerted by the light springs 60 between the adapter 58 and the carriage 48. The taper of the cup raceway 30 is the same as that of the raceway 96 on the tapered bore driver 94, and at the very instance the spindle 70 begins to move, the bearing B has end play equaling the maximum clearance $x$ between the adapter 58 and carriage 48. Continued advancement causes the end play as well as the clearance $x$ to reduce with the two always being equal. In other words, the clearance x represents the end play in the bearing at any instant. The advancement continues until the switch 86 signals that the clearance $x$ has reached the prescribed value, at which time the press ram 90 and tapered bore driver 94 are backed off and the adjustment of the bearing B is complete.

Finally, the clutch C is removed from the apparatus A, and the flange 6 is welded to the stub axle 4, preferably by electron beam welding procedures. Then the cone 22 of the bearing B is pressed still further over the reduced shaft surface 10 until it reaches a position wherein the overall clutch thickness, that is the axial dimension, is within prescribed tolerances. This does not disturb the adjustment of the bearing B.

The foregoing procedure for assemblying the bearing B is simple and extremely fast. It involves no shims or adjusting nuts as do conventional procedures.

To enhance the holding power of the cup 20 in the bore 16 of the pulley 2, the cup 20 on its outwardly presented cylindrical surface may be provided with an outwardly opening groove 98 (FIG. 6) into which the somewhat softer metal of the pulley 2 will deform, particularly after the clutch C is put into operation. The leading end of the groove 98, that is the end which is located closest to the cup front face so as to lead as the cup 20 is pressed into the bore 16, is quite sharp, whereas the trailing end, which is the end located closest to the cup back face, is somewhat beveled so that it will not bite into the wall of the bore 16 as the cup 20 is advanced.

MODIFICATION

A modified adjustment procedure and apparatus A' (FIGS. 8–10) may be used to adjust a so-called direct-on unitized bearing B' (FIG. 7). In this bearing, the cone is eliminated and the tapered inner raceway 32' is machined directly into the axle 4', which in this case is the flanged rear axle of an automobile. Thus, the portion of the axle 4' surrounded by raceway 32' forms the inner race of the bearing B'. The cup 20' fits into the bore 16' of an axle housing 100, as does the cup rib ring 28' which has an axial extension 102 projecting inwardly along the tapered cup raceway 30'. The length of the axial extension 102 is such that it causes the rollers 24' of the bearing B' to run on apex. The cup 20' and rib ring 28' are held in place by an end plate 104 which is bolted to the housing 100. In contrast, to the bearing B, the cone rib ring 34' for the bearing B' is press-fitted over the axle 4' and has an axial projection 106 against which the small diameter end faces of the rollers 24' bear. The position of the cone rib ring 34' determines the adjustment of the bearing B'.

The apparatus A' (FIG. 8) includes a rigid frame 110 having an axle support base 112 positioned thereon on heavy springs 114. The support base 112 is configured to receive the flanged end of the axle 4' and to support the axle 4' in an upright position. The frame 110 also has a clamp 116 for holding the support base 112 in a depressed position.

At its upper end the rigid frame 110 carries a retaining base 118 which rotates relative to the frame 110 on a pair of preloaded tapered roller bearings 120. The retaining base 118 contains an adapter 122 which is urged upwardly thereon by light springs 124. The movement of the adapter 122 relative to the retaining base 118 is confined to a maximum clearance $x'$ by a locking plate 126. The adapter 122 has a split yoke 128 which when in its closed position supports the cup 20' and cup rib ring 28' in a fixed position relative to the frame 110. In particular, the split yoke 128 has an upwardly opening recess 130 sized to snugly receive the cup 20'. It also has a shoulder 132 at the bottom of the recess 130, and this shoulder locates the cup rib ring 28'. When so supported, the cup 20' encircles the tapered raceway 32 on the axle 4'. When the split yoke 128 is opened the cup 20' and rib ring 28' are easily removed from it.

Figure 8:
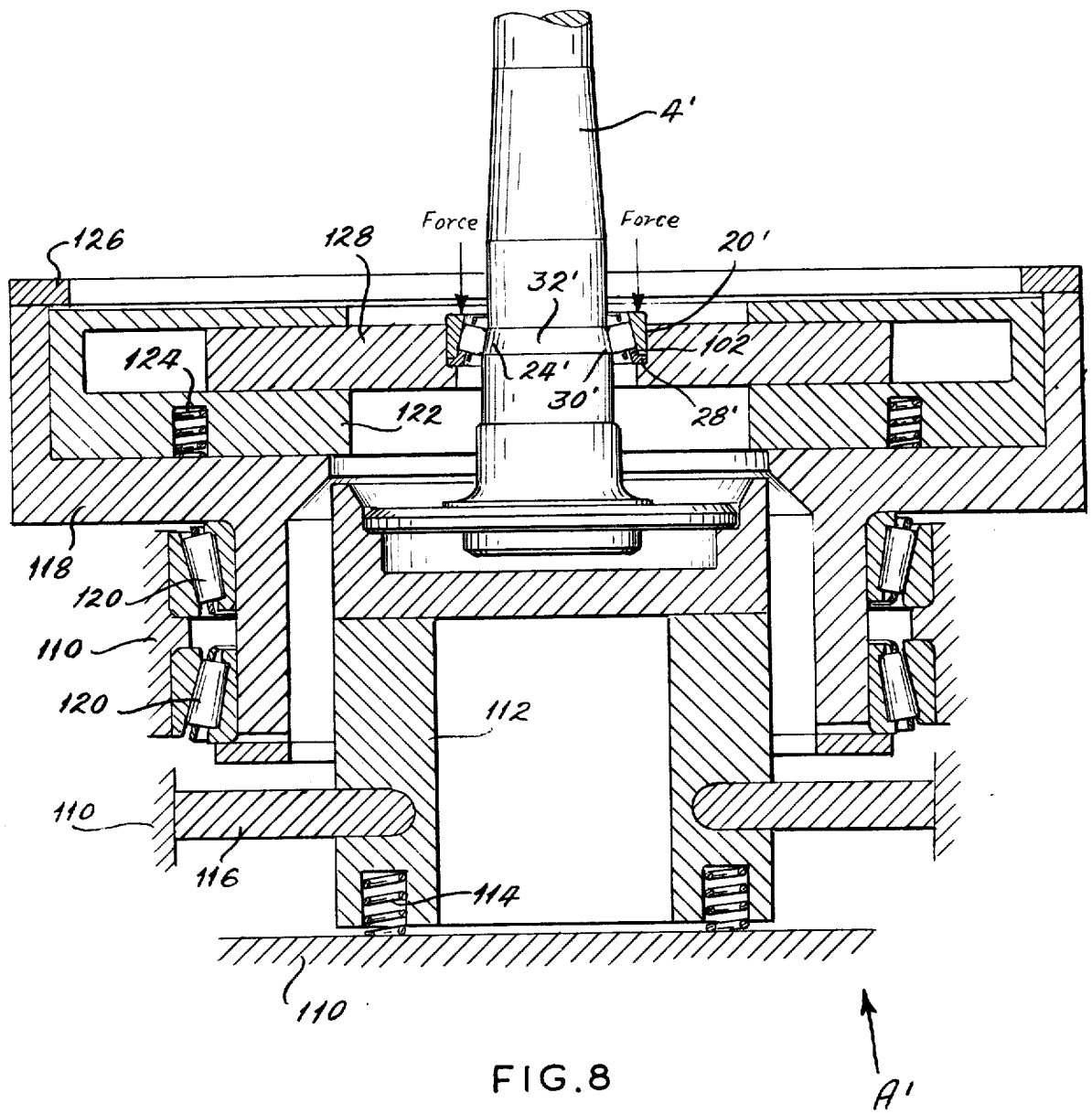
FIG. 8 is a sectional view showing the bearing of FIG. 7 in a no end play condition in a modified adjusting apparatus.

To assemble and adjust the bearing B', the flanged end of the axle 4' is first installed on the axle support base 112 with the yoke 128 open. The yoke 128 is then closed and the cup rib ring 28', the rollers 24', and the cup 20' are all installed in the recess 130 in that order (FIG. 8). The rollers 24' will of course be adjacent to the raceways 30' and 32' of the cup 20' and axle 4', respectively.

Once the axle 4', the cup rib ring 28', rollers 24' and cup 20' are all in place, an axial force is applied to the back face of the cup 20', and the force is of sufficient magnitude to overcome the force exerted by the light adapter springs 124 (FIG. 8). Hence, the adapter 122 will move downwardly a distance equalizing the maximum clearance $x'$ and will bottom out against the retaining base 118. Since the cup 20' is rotating due to the rotation imparted to the retaining base 118, the rollers 24' will seat against the raceways 30' and 32' and will further move axially toward the cup rib ring 28' until their large diameter ends contact that rib ring 28'. Moreover, the axle support base 112, being mounted on the springs 114, moves downwardly and assumes a position which maintains the axle 4' in the position it would have if the bearing B' were operated at preload. In other words, when the cup 20' is inserted to its fullest extent into the yoke 128 and the adapter 122 bottoms out so that the axial loading is transmitted to the support base springs 114, the rollers 24' and axle 4' will automatically position themselves in the condition of no end play with respect to the cup 20'.

Figure 9:
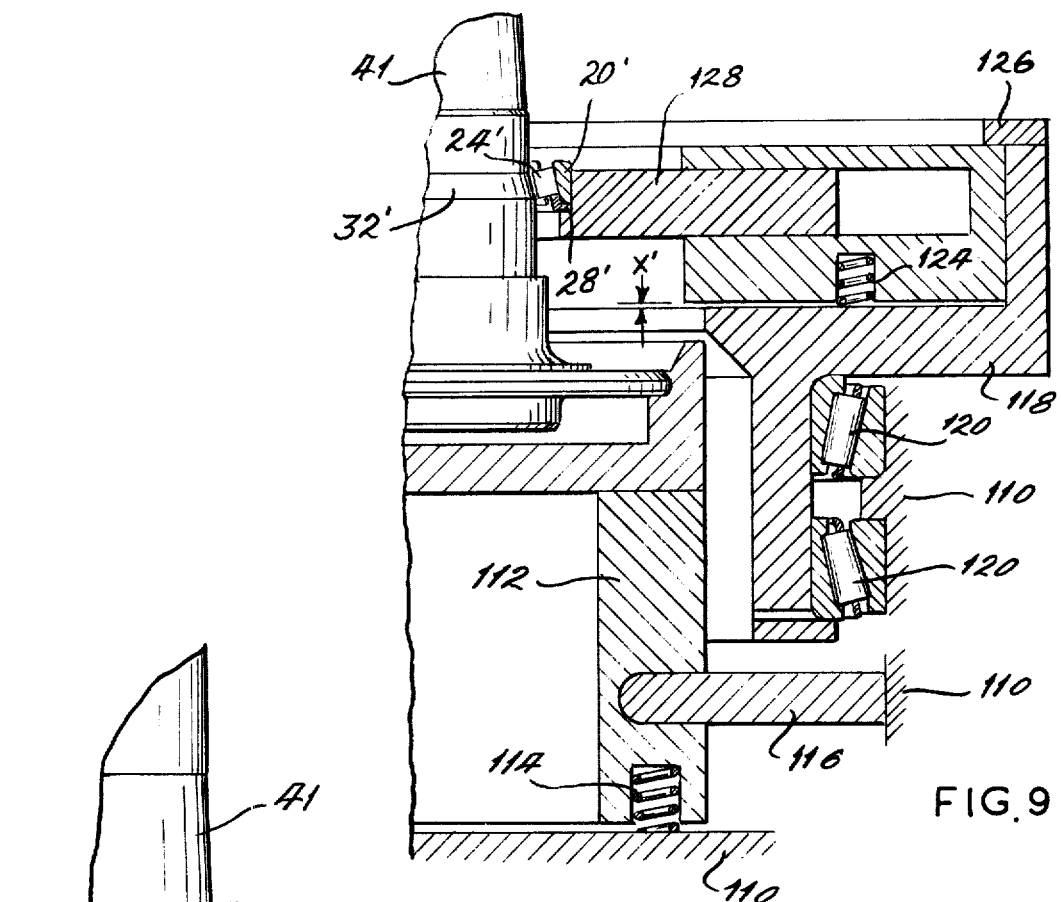
FIG. 9 is a sectional view showing the adjusting apparatus of FIG. 8 positioning the bearing of FIG. 7 in an end play condition.

Once the rollers 24' and axle 4' reach the no end play condition, the clamps 116 are activated and the force on the cup 20' is thereafter released. This causes the adapter 122 as well as the cup 20' and cup rib ring 28' to move upwardly a distance equal to the maximum clearance $x'$ (FIG. 9). The axle 4', however, remains in the same position, so that after the force is released the partially assembled bearing B' has end play equaling the maximum clearance $x'$.

Figure 10:
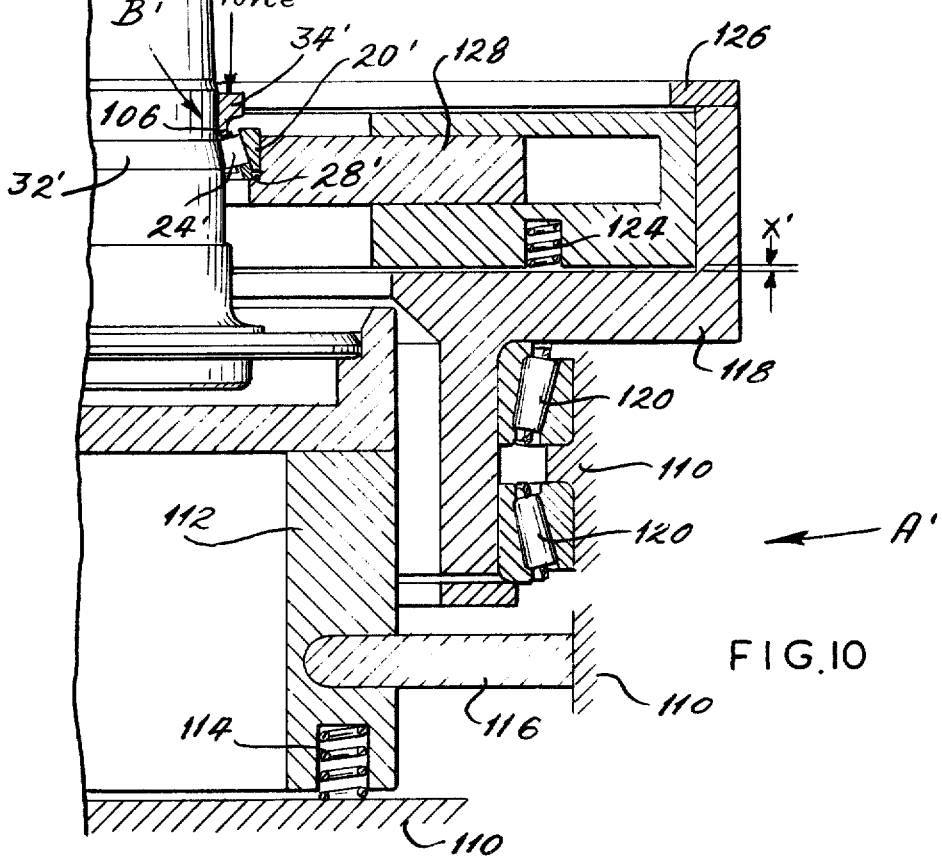
FIG. 10 is a sectional view showing the bearing of FIG. 7 as it is brought to the position of proper adjustment in the adjusting apparatus.

Thereafter, the cone rib ring 34' is fitted over the axle 4' and pressed toward the rollers 24'. In time, the axial extension 106 of the cone rib ring 34' will contact the small diameter ends of the rollers 24' and the force exerted on the cone rib ring 34' will be transmitted through the rollers 24' to the cup rib ring 28' and thence to the adapter 122 which will move downwardly against the force exerted by the light springs 124 (FIG. 10). When the clearance $x'$ between the adapter 122 and the retaining base 118 reaches a prescribed magnitude, equaling the desired adjustment for the bearing B', the force applied to the cup 20' is released and the assembled bearing B' has the correct adjustment.

The split yoke 128 is then opened and the cup 20', rib ring 28' are installed in the axle housing 100 along with the axle 4'.

This invention is intended to cover all changes and modifications of the example of the invention herein chosen for purposes of the disclosure which do not constitute departures from the spirit and scope of the invention.

What is claimed is:

1. A process for adjusting a single row tapered roller bearing capable of taking thrust loading in both axial directions and including tapered rollers and inner and outer tapered confining surfaces for confining the rollers in the radial direction and end confining surfaces for confining the rollers in the axial direction, said process comprising: bringing the rollers into a condition of no end play with respect to at least one of the tapered confining surfaces and the end surface at the large diameter ends of the rollers whereby the rollers will bear firmly against those surfaces; holding one of the confining surfaces in a fixed axial position with respect to reference means located remote from the bearing; effecting movement in the axial direction between the inner tapered confining surface and the end confining surface at the large diameter ends of the rollers so as to cause the rollers to move out of the condition of no end play and into a condition of end play; thereafter moving one of the confining surfaces axially relative to another of the confining surfaces such that a force is transmitted through the rollers to cause still another of the confining surfaces to move in the axial direction relative to said another confining surface such that the relative movement brings the rollers closer to the condition of no end play, and terminating the relative movement between confining surfaces when the bearing adjustment measured at the remote reference means reaches a prescribed value.

2. The process according to claim 1 wherein the end confining surfaces are on rib rings and the tapered confining surfaces are tapered raceways; and wherein said one confining surface which is moved to bring the rollers toward a condition of no end play is the outer tapered confining surface.

3. The process according to claim 2 wherein the step of bringing the rollers into a condition of no end play comprises: bringing an inwardly presented tapered surface into contact with the rollers and urging it axially toward the rib ring at the large diameter ends of the rollers, said inwardly presented tapered surface having the same taper and being of the same general size as the outer tapered raceway.

4. The process according to claim 1 wherein said one confining surface which is moved to bring the rollers toward a condition of no end play is the end confining surface at the small diameter ends of the rollers and said another surface is the inner tapered confining surface.

5. The process according to claim 4 wherein the step of bringing the rollers into a condition of no end play comprises: simultaneously moving the outer tapered confining surface and the end surface at the large diameter end of the rollers relative to the inner tapered confining surface.

6. A bearing assembly for taking thrust loading in both axial directions, said bearing assembly comprising:
first means provided with an outwardly presented tapered confining surface; second means provided with an inwardly presented confining surface which surrounds the tapered confining surface of the first means; tapered rollers arranged in a single row between the tapered confining surfaces; third means mounted in a fixed axial position with respect to the first means and provided with an end confining surface at the small diameter end of the outwardly presented tapered confining surface on the first means for bearing against the small diameter end faces of the rollers; fourth means mounted in a fixed axial position with respect to the second means and provided with an end confining surface at the large diameter end of the inwardly presented tapered confining surface on the second means for bearing against the large diameter ends of the rollers, whereby the rollers are confined radially by the tapered confining surfaces and axially by the end confining surfaces, and a mounting member on which at least one of the means is mounted by a friction fit between the member and said means, the position of said means on the mounting member determining the adjustment of the bearing.

7. A process for adjusting a single row tapered roller bearing capable of taking thrust loading in both axial directions and including an inner race having a tapered inner raceway, an outer race having a tapered outer raceway, a small rib ring at the small diameter end of the inner raceway, a large rib ring at the large diameter end of the large raceway, and tapered rollers having side surfaces against the raceways and conforming to the tapers thereof and end faces located opposite to the rib rings, said process comprising:

seating the rollers snugly against one of the tapered raceways and against at least one of the rib rings so that the rollers are in a condition of no end play; ascertaining the positions of large rib ring and the inner race relative to each other in the axial direction; moving the large diameter rib ring relative to the inner raceway to bring the rollers into a condition of end play; effecting relative movement between the large rib ring and the inner raceway in the axial direction to bring the rollers toward the condition of no end play, the relative movement continuing until the inner raceway and the large diameter rib ring are offset a prescribed distance in the axial direction from the relative position at which no end play existed.

8. The process according to claim 7 wherein the step of effecting relative movement between the large rib ring and the inner raceway comprises: moving the outer race relative to the inner race with the tapered rollers seated against the raceways of the two races.

9. The process according to claim 8 wherein the large diameter end faces of the rollers bear against the large rib ring as the outer race is moved relative to the inner race with the tapered rollers seated against the raceways of the two.

10. The process according to claim 7 wherein the step of effecting relative movement between the large rib ring and the inner raceway comprises: moving the small rib ring relative to the inner race with the small rib ring bearing against small diameter ends of the rollers and the large diameter ends of the rollers bearing against the large rib ring.

* * * * *